March 24, 1925. 1,530,819
O. H. ENSIGN
MULTIPLE DRILL PRESS
Filed April 18, 1922.
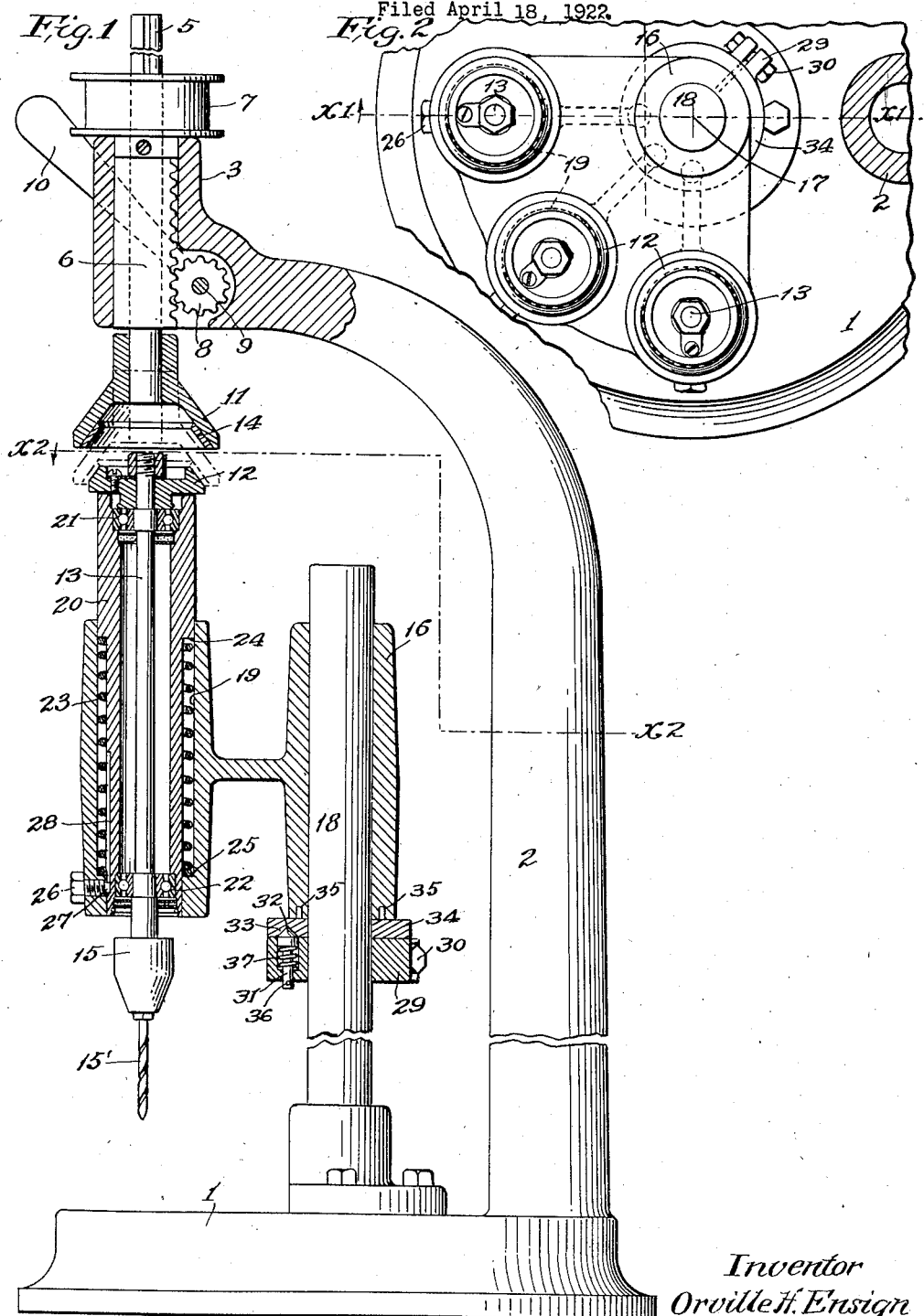
Witness
C. C. Holly
Inventor
Orville H. Ensign
by James R. Townsend
his atty Patented Mar. 24, 1925.

1,530,819

UNITED STATES PATENT OFFICE.

ORVILLE H. ENSIGN, OF PASADENA, CALIFORNIA.

MULTIPLE-DRILL PRESS.

Application filed April 18, 1922. Serial No. 555,484.

*To all whom it may concern:*

Be it known that I, ORVILLE H. ENSIGN, a citizen of the United States, residing at Pasadena, in the county of Los Angeles and State of California, have invented a new and useful Multiple-Drill Press, of which the following is a specification.

An object of this invention is to construct a drill press whereby means are provided for selectively operating drills of various sizes without stopping rotation of the driving spindle.

An object of this invention is to reduce the number of operations heretofore required to drill a plurality of holes having various sizes with a single spindle drill press.

An object is reduction of manufacturing costs by increasing production.

An object is to provide attachment means for a single spindle drill press whereby a plurality of holes of various sizes may be drilled in a piece of material without removing the drill from the chuck.

Another object is to reduce the consumption of power from a line shaft for doing a given number of drilling operations with various sizes of drills.

A further object is to reduce the maintenance cost in a factory when a large number of drill operations are required to complete the manufacture of articles.

A still further object is to provide novel means whereby the drill and chuck are stationary when not in use and which will be set in motion when depressed to enter the material to be drilled.

Other objects, advantages and features of invention may appear from the accompanying drawing, the subjoined detail description and the appended claims.

The accompanying drawing illustrates the invention.

Figure 1 is an end elevation partly in section showing a drill press constructed in accordance with this invention. Line $x^1$, Fig. 2 indicates the plane of section. Dotted lines show the driving clutch member depressed so as to engage the driven clutch member.

Fig. 2 is a section on line $x^2$—$x^2$, Fig. 1, showing a plurality of auxiliary spindles.

1 indicates a base plate or table for holding the work to be drilled, 2 an upright or column, 3 an overhanging arm or head, all of which represents a conventional single spindle drill press.

The main driving spindle 5 is rotatably mounted in the rack 6 which is slidably mounted in the head 3. The spindle 5 is adapted to be rotated by the pulley 7 which may be connected to any suitable source of power as by a belt, not shown. The rack 6 is adapted to be moved up and down in the head 3 by means of a pinion 8 which is secured to a shaft 9 rotated by a handle 10 and such up or down movement of the rack 6 moves the conical driving clutch member 11 that is secured to the driving spindle 5 out of and into engagement with a cooperating or driven conical clutch member 12 which is secured to the upper end of a vertically movable auxiliary or chuck operating spindle 13, which when not in engagement with the driving spindle, is normally in a stationary position.

A drill chuck 15 is mounted on the lower end of the driven spindle 13 and is adapted to removably hold various sized drills 15'. A strip of leather 14 is secured to the driving clutch member 11 for obtaining greater frictional resistance when the clutch members 11, 12 are in engagement.

A support 16 is pivoted on an axis 17 which is in parallelism with the axis of the driving spindle 15 and may be either a post 18 or the column of the drill press, and is provided with one or more bores 19 in parallelism with and radially spaced about said axis, and that are each adapted to receive a sleeve 20 in which the chuck operating spindle 13 is rotatably mounted and held in alinement therein by means of the anti-friction bearings 21, 22.

A spring 23 encircling the sleeve 20 and operating between a shoulder 24 on the sleeve 20 and a shoulder 25 in the bore 19 resiliently supports the sleeve 20 and chuck operating spindle 13 out of operating position.

Means are provided for preventing the spring 23 from forcing the sleeve 20 out of the bore 19 and comprise a screw 26 which has a point 27 that engages the lower end of the slot 28 formed in the sleeve 20.

A collar 29 is clamped to the post 18 by means of the screw 30, and has yieldingly mounted therein a button 31 having a tapered head 32 which cooperates with countersunk holes 33 in the plate 34 that is secured to the support 16 by the dowel pins 35. A pin 36 prevents the button from being forced out of the collar 29 by the spring 37 when the parts are disassembled.

The holes 33 are in radial alinement with the driving spindle.

In operation a chuck operating spindle 13 carrying the drill size required is selected from the plurality of spindles 13 which carry various sized drills to suit the work to be done, and the support is revolved on its axis until such spindle is in alinement with the driving spindle 5. The button 31 will then enter the hole 33 which is in radial alinement with the selected spindle and will assist in alining the selected spindle with the driving spindle.

To rotate the chuck operating spindle 13 that is normally at rest, the handle 10 is operated to move the driving clutch member 11 into engagement with the clutch member 12 which completes the alinement of the spindles 5 and 13.

Further movement of the handle 10 in the requisite direction will force the chuck 15 and drill 15' downward into the work.

When the handle 10 is turned to release the clutch members the spring 23 will force the sleeve 20, chuck operating spindle 13 and drill 15' upward returning the spindle to the normal stationary position. The point 27 of screw 26 engaging the lower end of slot 28 limits the upward movement of the chuck operating spindle.

From the foregoing it is apparent that the support 16 may be manufactured as an attachment for standard drill presses and may be easily attached to the post 18 which can be fixed to the base 1 or table for holding the work to be drilled or to the column 3 or the support may be pivoted directly on the column 2.

I claim:

1. A multiple spindle attachment for a drill press comprising a column for attachment to the work table of said drill press that is adapted to hold the work to be drilled; a driving spindle adapted to be moved upwardly and downwardly and fitted with a driving member of a cone clutch; a support mounted to rotate on said column and containing a plurality of chuck operating spindles, said chuck operating spindles being adapted to be raised by a spring, and provided at the top with the driven member of a cone clutch; said chuck operating spindles being adapted to be pressed onto the work by the downward movement of the driving spindle.

2. A multiple spindle attachment for a drill press comprising a column for attachment to the work table of said drill press that is adapted to hold the work to be drilled; a driving spindle carrying the driving member of a cone clutch; a plurality of driven spindles carrying drills and pivotally connected to said column, and adapted to be rotated therearound; a driven member of a cone clutch secured to each of the driven spindles and adapted to center the driven spindle and its drill with the driving spindle during operation.

3. A drill press attachment comprising a post adapted to be secured to the work table of a drill press and in parallelism with the driving spindle of said drill press; a support pivoted to said post; a plurality of bores in said support radially spaced around the pivot of said support; sleeves mounted for vertical movement in said bores; chuck operating spindles in said sleeves; and adapted to be selectively operated by said driving spindle; and yielding means in said bores to normally support said sleeve and chuck operating spindle out of operating position.

4. A drill press attachment comprising a post adapted to be secured to the work table of said drill press; a driving spindle; a support pivoted to said post; a plurality of bores in said support; chuck operating spindles mounted in said bores and adapted to be selectively driven by said driving spindle; and yielding means in said bores adapted to normally support said spindles out of operating position.

5. A multiple spindle attachment for a drill press comprising a column for attachment to the work table of said drill press that is adapted to hold the work to be drilled; a support pivotally connected to said column and provided with bores radially spaced about said column; chuck operating spindles in said bores; a driving spindle adapted to selectively depress and drive said chuck operating spindles; and means secured to said column and support to assist in alining the selected chuck operating spindle with the driving spindle.

6. In a drill press having a driving spindle; a support pivoted on an axis in parallelism with the axis of the driving spindle and provided with bores spaced radially around the pivot of the support; sleeves slidably mounted in said bores; chuck operating spindles carried by said sleeves and adapted to be depressed and rotated by said driving spindle; shoulders in said bores; shoulders on said sleeves; and yielding means operating between said shoulders to normally support the chuck operating spindles out of operating position.

In testimony whereof, I have hereunto set my hand at Los Angeles, California, this 8th day of April, 1922.

ORVILLE H. ENSIGN.

Witness:
JAMES R. TOWNSEND.